(12) United States Patent
Okada et al.

(10) Patent No.: US 6,439,606 B2
(45) Date of Patent: Aug. 27, 2002

(54) THREE-DIMENSIONAL AIR BAGS FOR VEHICLES

(75) Inventors: Yasushi Okada; Masaru Ido; Tatuo Hirano; Yuji Kuriyama; Kazumasa Suzuki; Hiroshi Ogawa; Rie Ichino; Kou Tajima; Junichi Asanuma, all of Aichi-ken (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/729,923

(22) Filed: Dec. 6, 2000

(30) Foreign Application Priority Data

Dec. 7, 1999 (JP) .............................. 11-347693
Dec. 10, 1999 (JP) .............................. 11-351623
Aug. 7, 2000 (JP) ........................... 2000-239043

(51) Int. Cl.[7] .............................................. B60R 21/16
(52) U.S. Cl. ..................... 280/743.1; 280/740; 280/742
(58) Field of Search ........................... 280/743.1, 743.2, 280/742, 740, 728.1

(56) References Cited

U.S. PATENT DOCUMENTS

| | | | | |
|---|---|---|---|---|
| 5,310,216 A | * | 5/1994 | Wehner et al. | 280/743 |
| 5,316,337 A | * | 5/1994 | Yamaji et al. | 280/743 |
| 5,423,273 A | * | 6/1995 | Hawthorn et al. | 112/441 |
| 5,454,594 A | * | 10/1995 | Kricki | 280/743.1 |
| 5,494,314 A | * | 2/1996 | Kriska et al. | 280/740 |
| 5,529,340 A | * | 6/1996 | Fairbanks | 280/743.1 |
| 5,632,506 A | * | 5/1997 | Shellabarger | 280/743.1 |
| 5,683,109 A | * | 11/1997 | Birman | 280/743.2 |
| 5,855,393 A | * | 1/1999 | Keshavaraj | 280/743.1 |
| 5,865,467 A | * | 2/1999 | Bito et al. | 280/743.1 |
| 5,913,535 A | * | 6/1999 | Taguchi et al. | 280/729 |
| 5,941,559 A | * | 8/1999 | Rudolf et al. | 280/729 |
| 5,945,184 A | * | 8/1999 | Nagata et al. | 428/35.2 |
| 5,975,571 A | * | 11/1999 | Ford et al. | 280/743.1 |
| 6,017,058 A | * | 1/2000 | Ross | 280/743.1 |
| 6,089,599 A | * | 7/2000 | Schimmoller et al. | 280/740 |
| 6,168,203 B1 | * | 1/2001 | Amamori | 280/743.1 |
| 6,299,206 B1 | * | 10/2001 | Keshavaraj | 280/743.1 |

FOREIGN PATENT DOCUMENTS

JP       Hei 11-5505       1/1999

* cited by examiner

*Primary Examiner*—Paul N. Dickson
*Assistant Examiner*—Deanna Draper
(74) *Attorney, Agent, or Firm*—Pillsbury Winthrop LLP

(57) ABSTRACT

A three-dimensional airbag for a vehicle having a main panel having a generally elongated shape. The main panel includes a pair of generally symmetric first portions extending from opposite sides of a fold line and a pair of second portions. A subpanel is secured to the main panel to form a hollow body. The first portions of the main panel are joined to each other along their edges. The edges of the second portions are secured to the edge of the subpanel to close the open front end of the hollow body to form an air bag. The air bag may further include at least one of a baffle for controlling the flow of air within the bag during inflation and a tether assembly for controlling the opening of the air bag.

21 Claims, 15 Drawing Sheets

Fig.5A
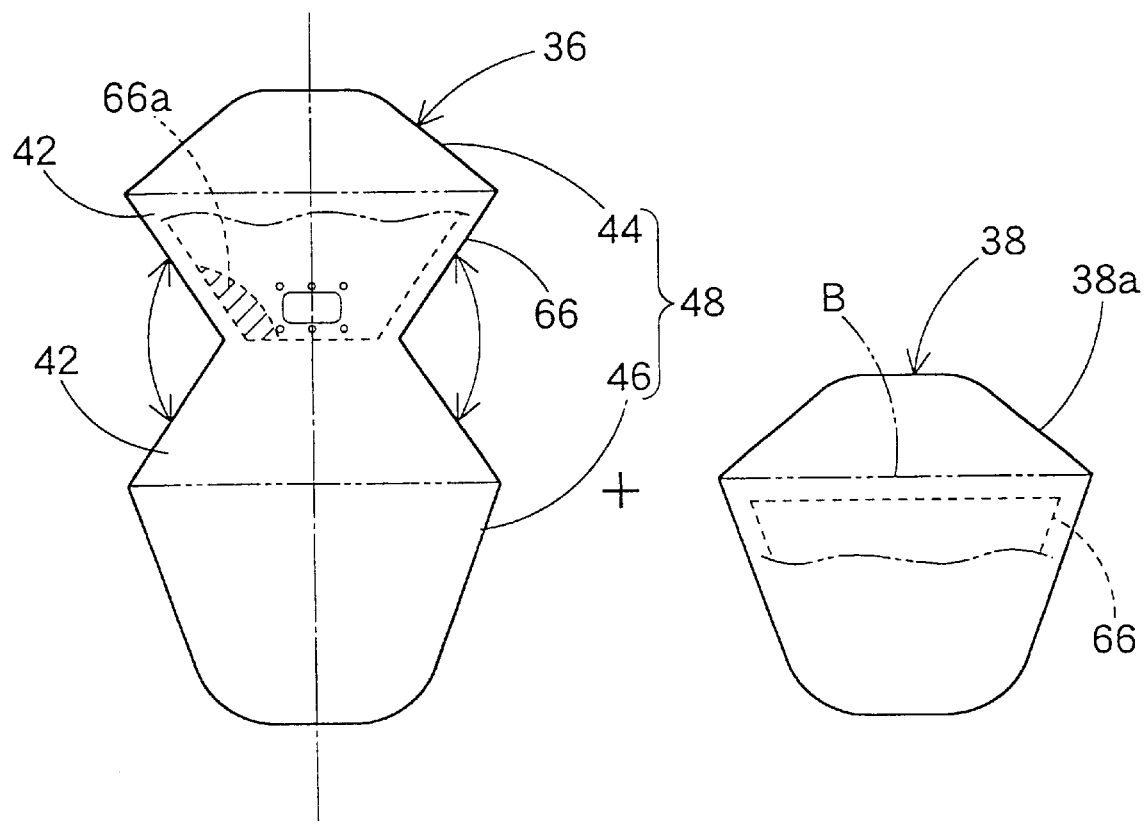
Fig.5B
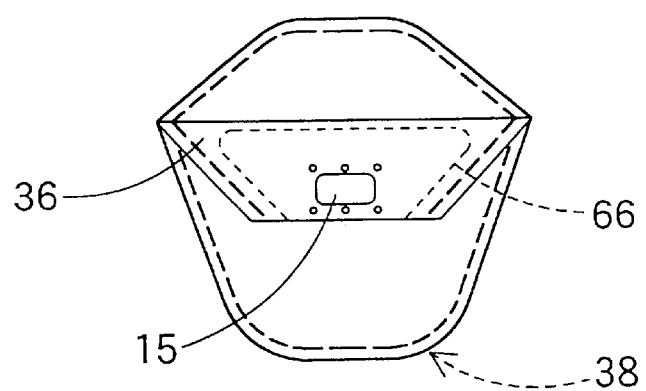

Fig.12A
Fig.12B
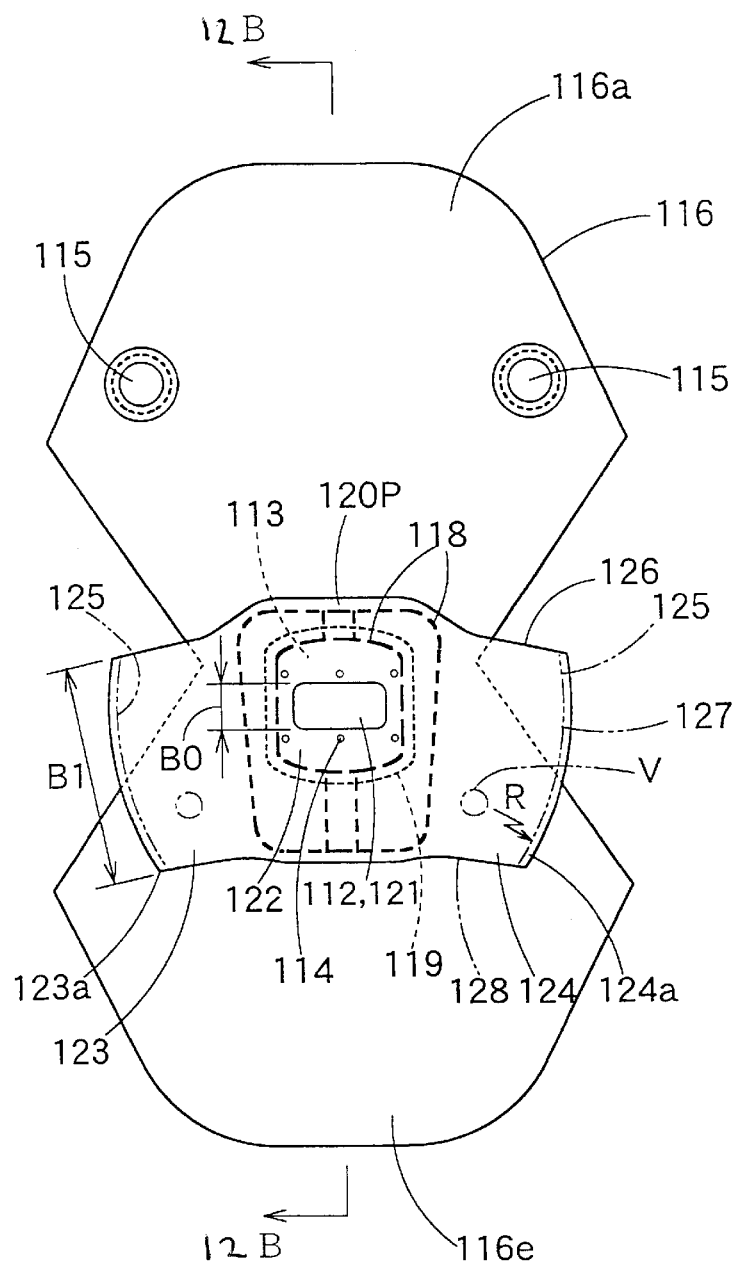
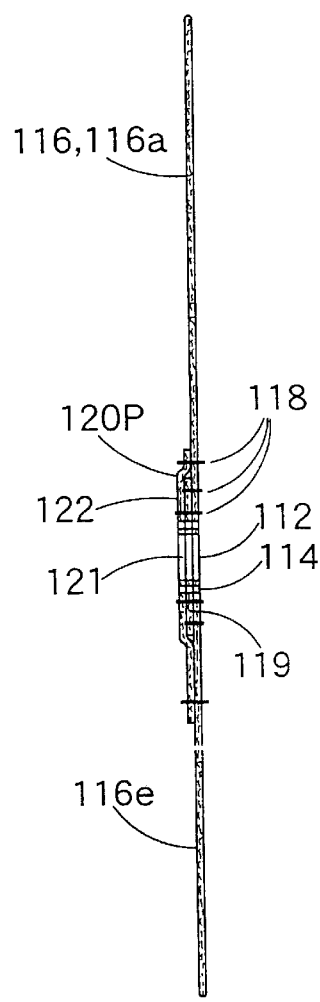

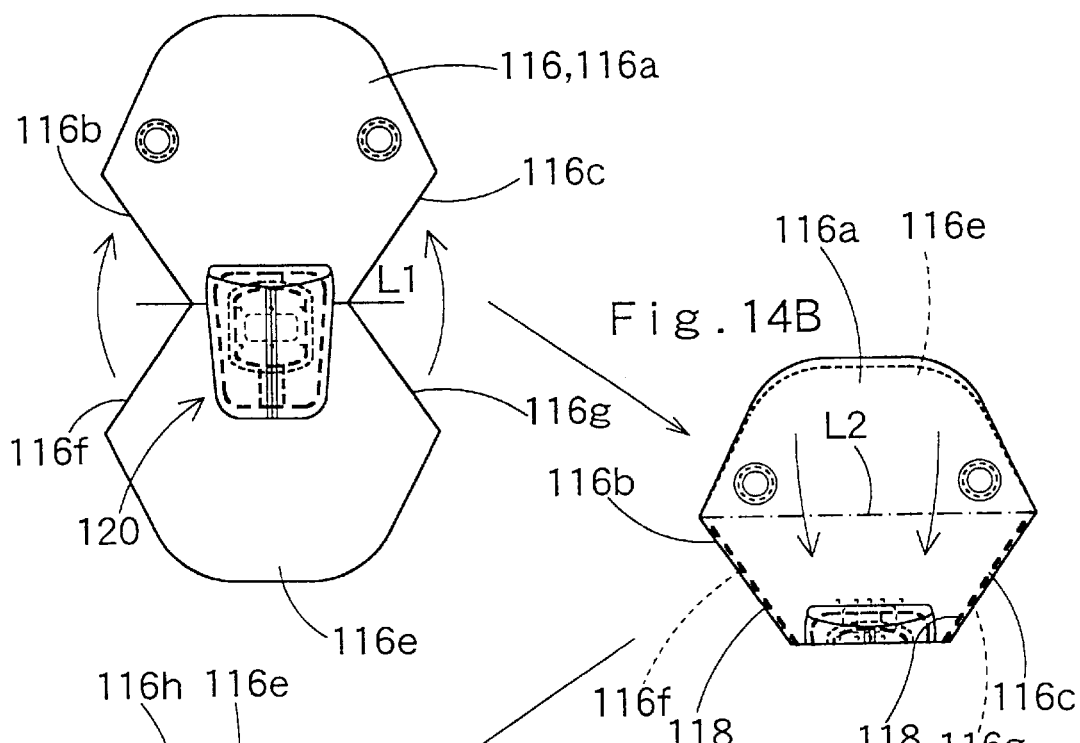
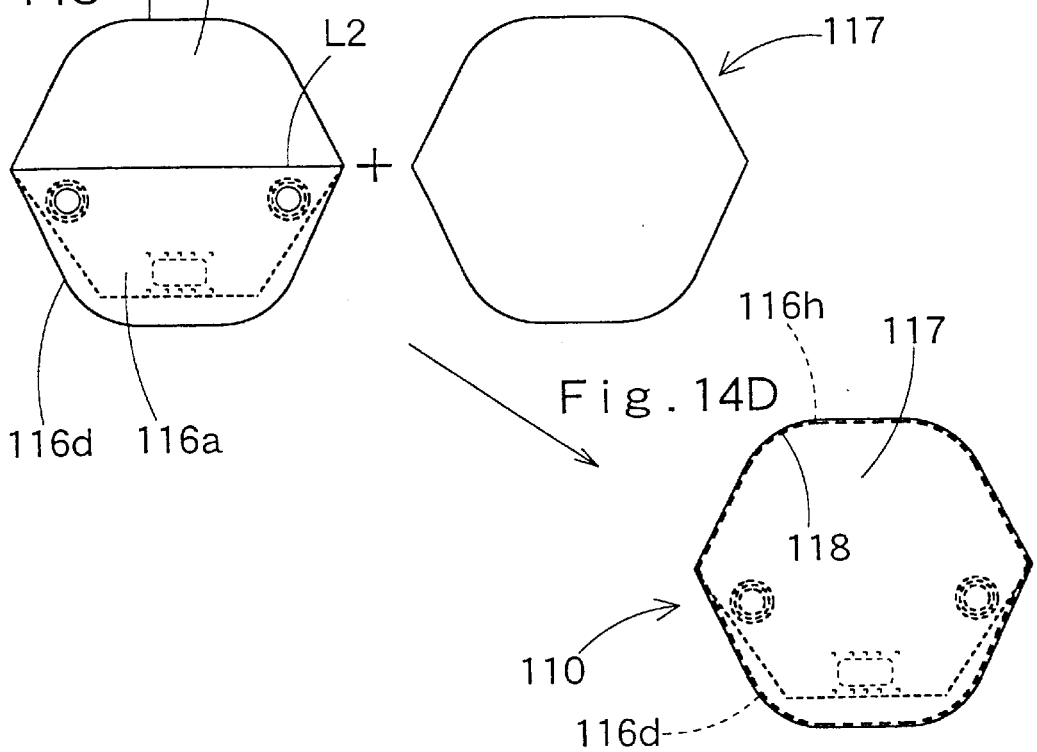

THREE-DIMENSIONAL AIR BAGS FOR VEHICLES

CROSS REFERENCE TO RELATED APPLICATIONS

This application relates to and claims priority under 35 U.S.C. §119 on Japanese Patent Application Nos. 11/347693, filed Dec. 7, 1999, 11/351623, filed Dec. 12, 1999 and 12/239043, filed Oct. 7, 2000.

FIELD OF THE INVENTION

The present invention relates to a three-dimensional air bag for a vehicle. More particularly, the present invention relates to a three-dimensional air bag that can easily be made by joining a plurality of sections together, and is useful for protecting the passengers in a motor vehicle.

BACKGROUND OF THE INVENTION

A three-dimensional air bag 12 according to the prior art is shown in FIGS. 1A and 1B. When inflated, the air bag 12 has a closed substantially rectangular shape. The air bag 12 has a rectangular base wall 14, an upper wall 16, a lower wall 18, a front wall 17, and a pair of side walls 20 and 22. The side walls 20 and 22 have an enlarged area adjacent the front wall 17, as shown in FIG. 1B.

The air bag 12 is assembled by sewing three panels together along their edges. The three panels include a main panel 24, which forms the base wall 14, upper wall 16, front wall 17 and lower wall 18, and a pair of side panels 26 and 28, which form the side walls 20 and 22, respectively, as shown in FIG. 1A. The main panel 24 has an air inlet 15 and a plurality of attaching holes 31. Each side panel 26 and 28 has a vent hole 27. There are three reinforcing cloth pieces sewn on the main panel 24. A first reinforcing cloth piece 30 is secured adjacent the air inlet 15. A pair of second reinforcing cloth pieces 32 are secured adjacent the end portions of the main panel 24, as shown in FIG. 1A. Each of the side panels 26 and 28 has a third reinforcing cloth piece 34 sewn thereto opposite the enlarged area, as shown in FIG. 1A. The air bag 12 has a total of five reinforcing cloth pieces.

The air bag 12, however, has numerous fabrication drawbacks. First, after fastening one of the side panels 26 or 28 to the main panel 24, it is necessary to manually adjust the position of the other side panel 26 or 28 to ensure the accurate positioning before fastening to the main panel 24. Therefore, it is essential to feed the bag manually through a sewing machine. As such, it is difficult to fabricate the air bag 12 by an automated process including the mechanical feeding of the work. Second, the air bag 12 requires at least three panels 24, 26 and 28. Third, the panels can be prepared only at a relatively low yield with a large waste of material, since the main panel 24 is by far greater in length than the side panels 26 and 28. Fourth, the fastening of the reinforcing cloth pieces 30, 32 and 34 is both labor and time intensive, since at least one reinforcing piece has to be fastened to each panel 24, 26 or 28 adjacent the base wall 14.

OBJECTS OF THE INVENTION

It is an object of the present invention to provide an airbag that overcomes the above-identified deficiencies.

It is an object of this invention to provide a three-dimensional air bag for a vehicle which can easily be made by an automatic process including the mechanical feeding of the work.

It is another object of the present invention to provide an airbag having an assembly therein for controlling the flow of air within the airbag during inflation.

It is another object of the present invention to provide an airbag having an assembly for controlling the inflation of the airbag.

SUMMARY OF THE INVENTION

The present invention is directed to an air bag formed by a main panel having an air inlet and a subpanel joined to the main panel. The main panel has a pair of first portions that are symmetric to each other with respect to the boundary located adjacent to the air inlet, and a pair of second portions extending in opposite directions from the first portions respectively. The subpanel has a shape identical to the combined shape of the second portions of the main panel, each of the first portions of the main panel have a pair of edges extending from the boundary to one of the second portions. The first portions being joined to each other along the edges adjoining each other to form with the second portions a hollow body having an opening at the front end remote from the air inlet. The subpanel being joined to the second portions of the main panel along their edges to close the opening.

In accordance with the present invention, the main panel has the first portions joined to each other along the adjoining edges, and is joined to the subpanel along the edges of the second portions and the edge of the subpanel. There is no overlapping portion between the joint between the first portions of the main panel and the joint between the main panel and the subpanel. With the present arrangement, there is no necessity to manually remove any panel to avoid any wrong joining when forming any such joint. Therefore, it is easy to employ an automatic sewing process including the mechanical feeding of the work for joining the panels, or panel portions, to make the air bag of this invention. It was possible to make any known air bag by an automatic sewing process involving the vertical motions of a needle.

The air bag according to the present invention has a smaller number of component parts. It essentially consists of only two panels, while at least three panels are required for forming any known air bag. The panels forming the air bag of this invention can be prepared at an improved yield. The main panel is relatively small in length, as the front wall of the air bag is formed by the subpanel. Moreover, it is sufficient to apply a single piece of reinforcing cloth to the main panel, since the main panel forms both a base wall surrounding the air inlet and the whole area surrounding the base wall. No reinforcing cloth is required for the subpanel. Thus, the air bag of this invention has a still smaller number of component parts and requires only a still smaller amount of time and labor for its fabrication.

The air bag according to the present invention may further include a tether having a pair of transverse edges secured to the base and front walls. The tether is adapted to divide the interior into an upper and a lower chamber upon inflation of the air bag. The tether is preferably sized to have a larger spacing on one side of the air bag. The tether as described prevents any undesirably heavy downward load from bearing upon any intefering object below the expanding lower compartment of the inflated air bag even after it has been fully stretched. More specifically, the tether preferably has along its edge secured to the front wall a width substantially equal to that of the air bag as inflated, and is partly cut away along its edge facing the exterior of the vehicle toward the air inlet of the air bag. Moreover, the tether preferably occupies an area of 50% to 80% in the plane in which it extends in the air bag as inflated.

According to another aspect of this invention, there is provided an air bag for an air bag device mounted in a dashboard. The air bag includes a baffle covering a gas inlet. The baffle controls the flow of gas within the airbag. The gas entering the air bag through the inlet during the initial stage of inflation strikes against the baffle and is divided into a stream of gas flowing forward and a stream of gas flowing backward. The baffle can be formed from only a small amount of material, since it does not have to be of any greatly enlarged length, but has only to be formed with a portion having a concavely curved inner surface facing the gas inlet. Nevertheless, it enables the air bag to extend backwardly along the surface of the dashboard during the initial stage of its inflation.

The cross-sectional area SF of the baffle at the front end is larger than the cross-sectional area SB at the back end. With this arrangement, a stream of inflating gas flowing forward in the bag is larger than a stream of gas flowing backward. This enables the air bag to have a portion protrude from the dashboard and extend backward quickly along a windshield, so that another portion thereof facing the passenger may become upright quickly.

BRIEF DESCRIPTION OF THE DRAWINGS

The present invention will be described in conjunction with the following drawings in which like reference numerals designate like elements and wherein:

FIG. 5A is a top plan view of the unassembled panels forming an air bag in accordance with another embodiment of the present invention;

FIG. 5B is a top plan view of the assembled panels of the air bag of FIG. 5A;

FIG. 12A is a top plan view illustrating the arrangement of components during a portion of the fabrication of the air bag of FIG. 9;

FIG. 12B is a sectional view taken along the line 12B—12B of FIG. 12A;

FIGS. 14A to 14D are top plan views illustrating further fabrication steps following the step shown in FIGS. 13A and 13B.

DETAILED DESCRIPTION OF THE PREFERRED EMBODIMENTS

Figure 1A:
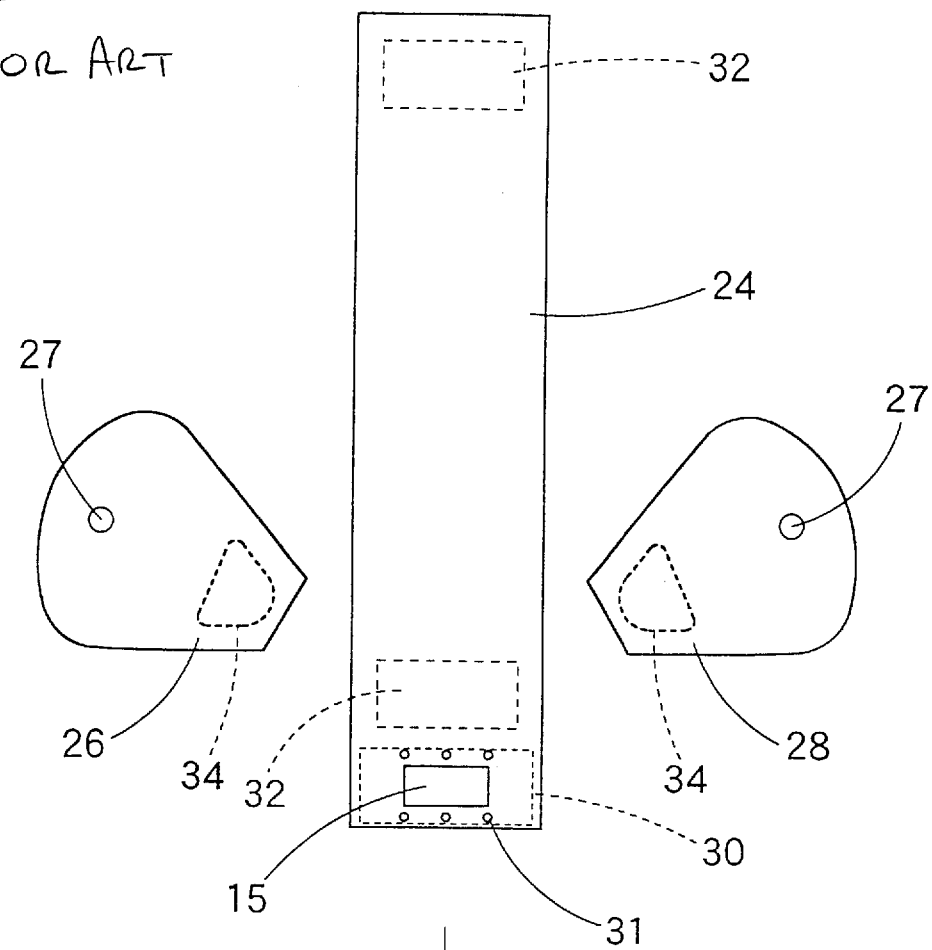
FIG. 1A is a top plan view of the unassembled three panels forming a conventional air bag.
Figure 1B:
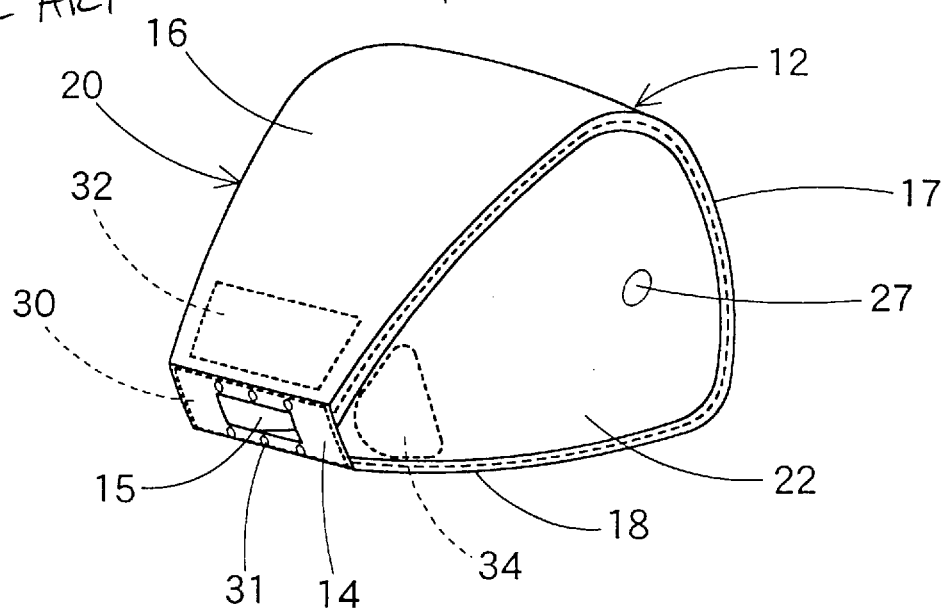
FIG. 1B is a perspective view of the conventional. air bag of FIG. 1A in an assembled and inflated condition.

An air bag 50 in accordance with an embodiment of the present invention will be described with reference to FIGS. 2A, 2B, 3 and 4. Some of the reference numerals used in FIGS. 1A and 1B are used again to denote like parts, and no description thereof is repeated.

The air bag 50 is essentially composed of a main panel 36 having an air inlet 15 and a subpanel 38. The main panel 36 and the subpanel 38 are both formed from a woven fabric of polar synthetic fibers, such as polyester or polyamide fibers. The present invention, however, is not limited to these materials; rather, it is contemplated that other materials having similar properties may be used to form the panels. The main panel 36 has a heat-resistant or reinforced area around the air inlet 15. More specifically, it has a reinforcing piece of cloth 40 attached to the fabric by sewing, or a layer of heat-resisting rubber caused by rubbing to adhere to it, or both.

The main panel 36 has a pair of first portions 42 that are symmetric to each other with respect to a boundary located adjacent to the air inlet 15. It also has a pair of second portions 44 and 46 extending in opposite directions from the first portions 42, respectively, and are collectively referred to as a pair 48. Each first portion 42 has a pair of opposite edges 42a and 42b extending from the boundary between the first portions 42 to one of the second portions 44 and 46. The main panel 36 may be formed of a single sheet of fabric. It is also contemplated that two or three sheets may be joined together by sewing or other suitable fastening techniques.

The main panel 36 has a reduced width at the boundary between the first portions 42. The width of the first portions 42 increases towards the second portions 44 and 46. Each first portion 42 has two halves that may be symmetric to each other with respect to the longitudinal centerline L of the main panel 36. Each first portion 42 has a generally equilateral trapezoid shape. The trapezoid has an angle θ between 30 to 80 degrees. The angle θ is preferably from 50 to 60 degrees, between each of its oblique sides and the base of the first portion 42. This arrangement is effective for the formation of a three-dimensional body having an enlarged end.

The present invention, however, is not limited to the above-described arrangement for the first portions 42. Each first portion 42 may alternatively have the shape of a right-angled trapezoid, or have a pair of parallel edges 42a and 42b, or a curved edge or edges 42a and 42b, depending on the desired unfolded form of the air bag to be made.

Figure 2A:
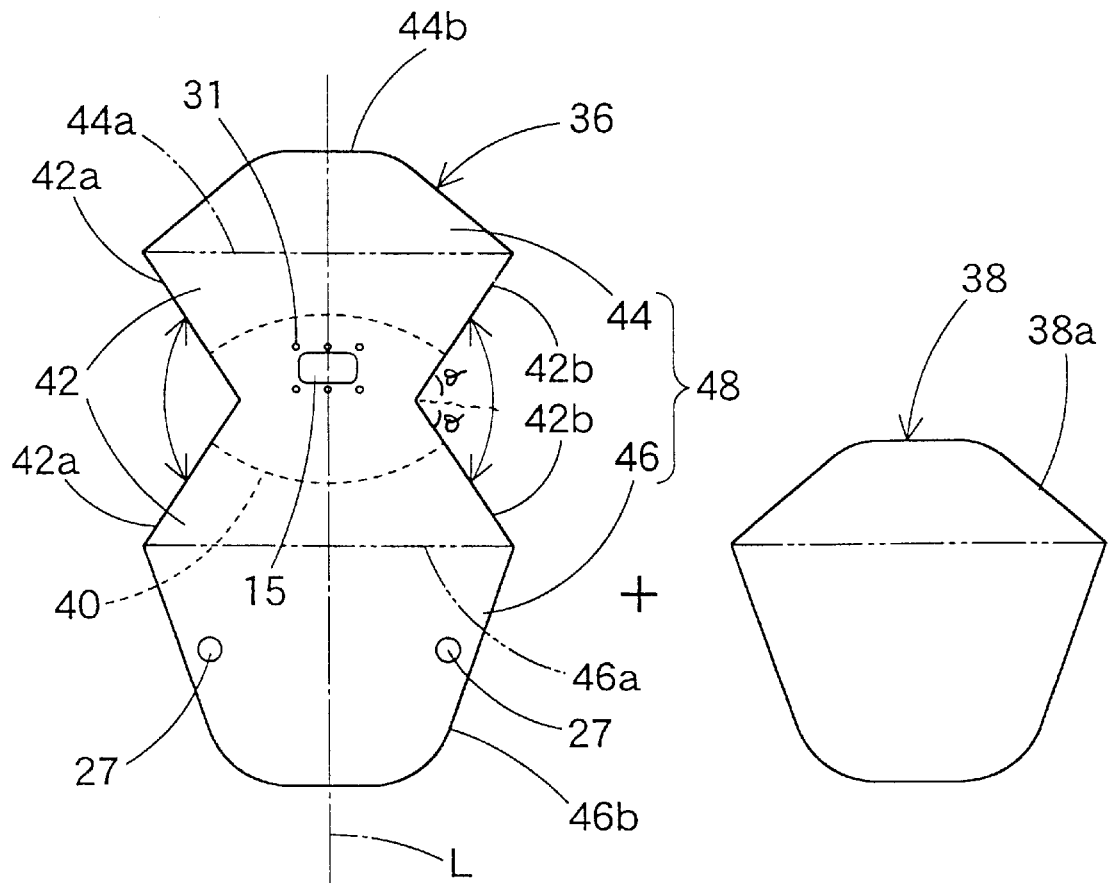
FIG. 2A is a top plan view of the unassembled panels forming an air bag in accordance with an embodiment of the present invention.
Figure 2B:
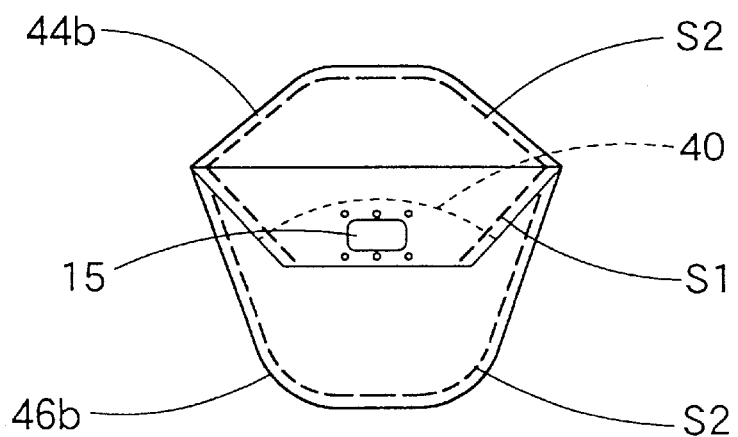
FIG. 2B is a top plan view of the assembled panels of the air bag of FIG. 2A.

The second portions 44 and 46 differ in shape from each other, and are a low equilateral trapezoid and a high equilateral trapezoid. Each has rounded top corners, as shown in FIGS. 2A and 2B. The trapezoid may have an angle of 10 to 75 degrees between each of its oblique sides and its base for the upper second portion 44, and an angle of 20 to 85 degrees for the lower second portion 46. The second portions 44 and 46, however, do not necessarily need to differ in shape. It is contemplated that the second portions 44 and 46 may have the same shape. Furthermore, each may be, for example, rectangular or dome-shaped, depending on the desired unfolded form of the air bag to be made.

The subpanel 38 has a shape equal to the combined shape of the second portions 44 and 46 of the main panel 36, if joined to each other at the edges 44a and 46a, as shown in FIG. 2B. In other words, it generally has a shape formed by joining a low equilateral trapezoid and a high equilateral trapezoid together at their bases.

The main panel 36 and the subpanel 38 are fastened along their edges to form an air bag 50. The main panel 36 and the subpanel 38 are fastened together by sewing the edges together. The present invention, however, is not limited to sewing; rather, other fastening modes are contemplated including but not limited to bonding using a suitable adhesive, high frequency welding, ultrasonic welding and heat sealing. The first portions 42 of the main panel 36 are first joined to each other along the edges 42a forming a first seam S1 on one side and also along their edges 42b forming another first seam S1 on the other side to make a hollow body having an open front end, as shown in FIG. 2B. Then, the second portions 44 and 46 of the main panel 36 with the edges 44a and 46a meeting each other are placed on the subpanel 38, and are joined to it along their adjacent edges 44b, 46b and 38a forming second seams S2, as shown in FIG. 2B.

The first seams S1 are formed by the edges 42a and 42b of each first portion 42 of the main panel 36. The second seams S2 are formed by the edges 44b and 46b of the second portions 44 and 46 joined to the edge 38a of the subpanel 38. The first and second seams S1 and S2 do not have any overlapping portions when the panels 36 and 38 are unfolded. With this arrangement, the air bag 50 in accordance with the present invention can be easily assembled. There is no need to manually adjust the position of the panels to prevent overlapping joints. There is, therefore, no necessity of removing any panel manually to avoid any wrong joining along the first and second seams S1 and S2. The air bag in accordance with the present invention is easy to make by an automatic sewing process including the mechanical feeding of the work.

Figure 3:
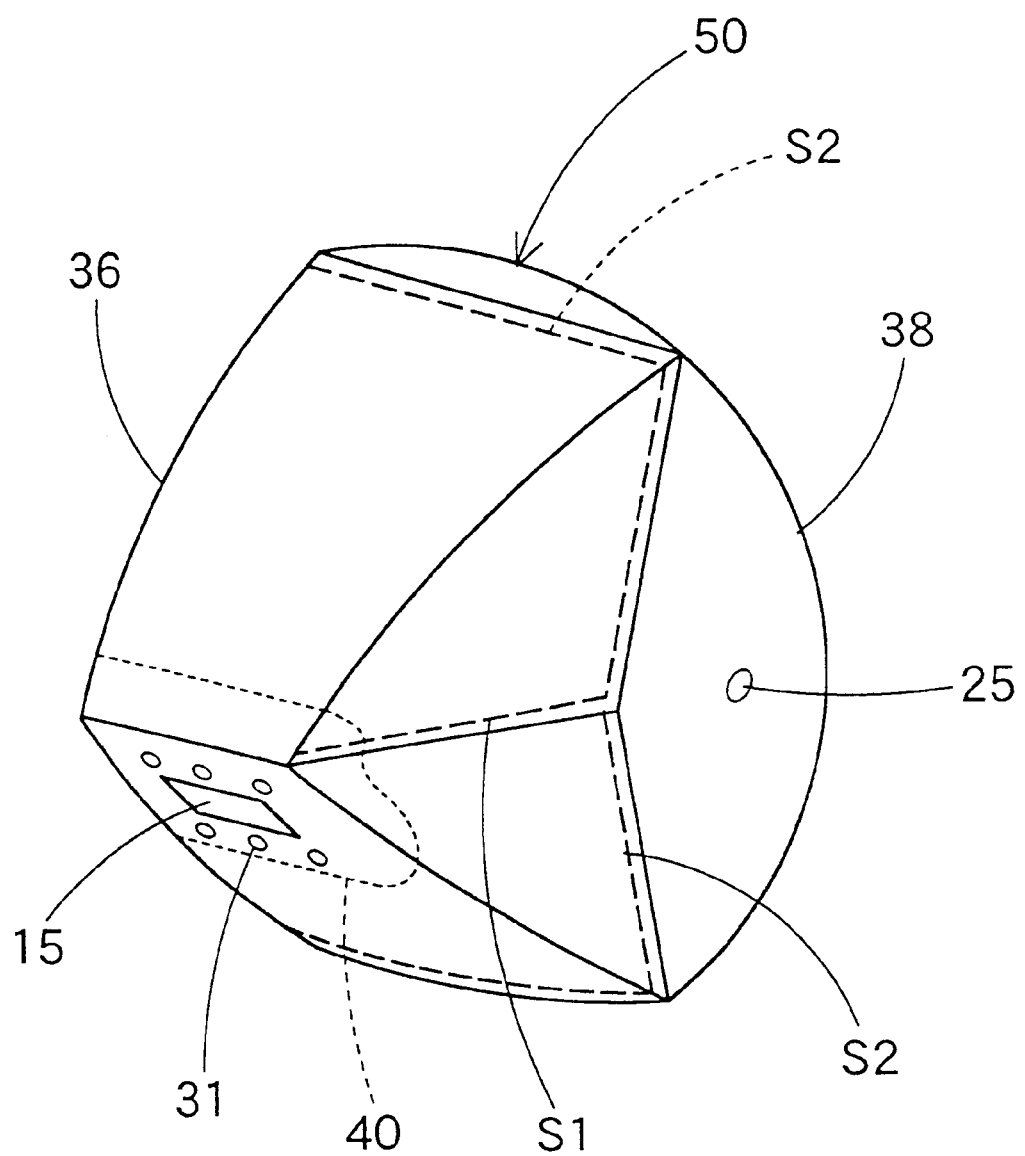
FIG. 3 is a perspective view of the air bag of FIGS. 2A and 2B in an inflated condition.
Figure 4:
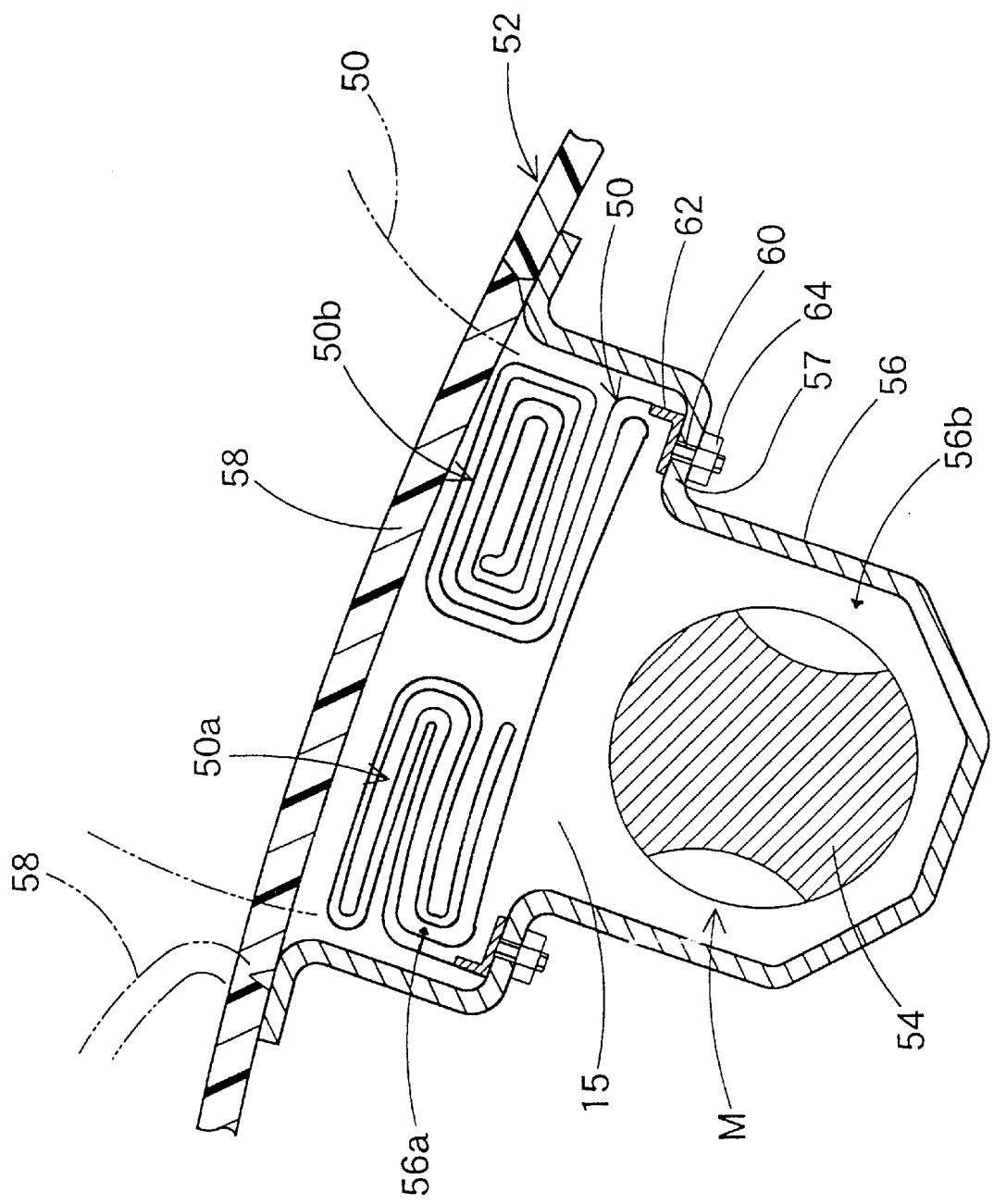
FIG. 4 is a schematic sectional view showing the air bag of FIGS. 2A and 2B in an uninflated stored condition.

The air bag 50 in accordance with the present invention has a three-dimensional shape when inflated, as shown in FIG. 3. Prior to deployment, the air bag 50 is folded for use in a top-mount type air bag device M mounted on a dashboard 52 in a motor vehicle, as shown in FIG. 4. The air bag device M is preferably located adjacent the passenger seat. The air bag device M includes the air bag 50, an inflator 54 for supplying inflating gas into the air bag 50, a housing 56 for the folded air bag 50 and the inflator 54, and a cover 58 closing the opening of the housing 56. The cover 58 is molded as an integral part of the dashboard 52.

The air bag 50 is folded in a customary way as will be described below. A plurality of retainers 62 having mounting bolts 60 are placed in the air bag 50 through the air inlet 15, and the bolts 60 protrude from the air bag 50 through the holes 31 around the air inlet 15. The air bag 50 is first folded along two transverse lines to form two folds facing each other above the center of the air inlet 15, and each fold is folded again along transverse lines to form a front fold 50a in a zigzag form or a rear fold 50b in rolled form relative to the dashboard 52 of a motor vehicle on which the air bag device M will be mounted, as shown in FIG. 4. The folds are rolled towards the air inlet 15 about longitudinal lines.

The retainers 62 are held against an annular shoulder 57 formed on the inner wall of the housing 56. The interior of the housing 56 has an upper portion 56a and a lower portion 56b. The retainers 62 are second to the housing 56 after the inflator 54 has been installed in the lower portion 56b. The retainers 62 include bolts 60 that protrude outwardly through the shoulder 57, which are secured by a nut 64 against the outer surface of the shoulder 57, such that the folded air bag 50 is installed in the upper portion 56a of the housing 56. It is contemplated that other suitable fasteners may be used to secure the air bag 50 within the housing 56.

The air bag device M is secured to the vehicle body by a suitable bracket, not shown. Upon sensing of a predetermined amount of impact on the vehicle by a sensing assembly, not shown, the inflator 54 is activated to jet out inflating gas through the gas outlet 54a. The inflating gas flows into the air bag 50 through the air inlet 15. As the air bag 50 inflates, it pushes the cover 58 open and springs out from the housing 56, as shown in phantom in FIG. 4, and is unfolded and further inflated to protect the passenger during impact.

Figure 6:
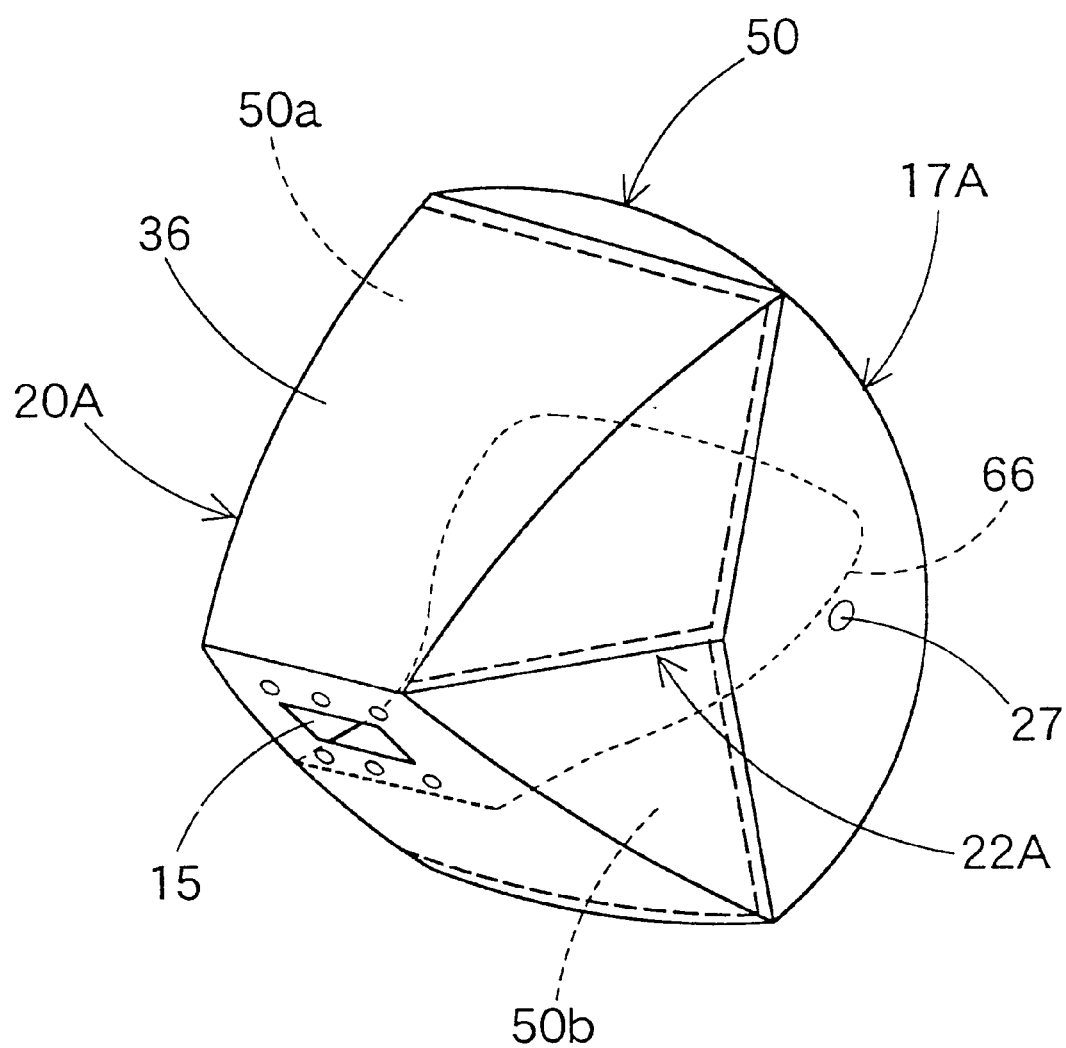
FIG. 6 is a perspective view of the air bag of FIGS. 5A and 5B in an inflated condition.

Referring now to FIGS. 5A, 5B and 6–9, a variation of the air bag 50 according to another embodiment of the present invention is disclosed. The air bag in accordance with the present embodiment includes an airbag opening control assembly for controlling/restricting the opening of the air bag during inflation. The air bag 50 includes a tether 66, which causes the inflated bag to expand in a restricted way. The tether 66 is also formed from a woven fabric, described above. Upon inflation of the air bag 50, the tether 66 extends between the base wall below the air inlet 15 and the front wall 17A, as shown in FIG. 6 in the vicinity of the maximum width B of the subpanel 38. The tether 66 divides the air bag 50 into upper and lower chambers 50a and 50b.

The tether 66 has a pair of opposite longitudinal edges extending along the side walls 20A and 22A, respectively, of the inflated air bag 50. The tether 66 is shaped to have a larger spacing between one side wall of the air bag 50 that faces the exterior of the vehicle, than from the opposing side wall. More specifically, the tether 66 has a width substantially equal to that of the inflated air bag 50 along its front wall 17A, and is partly cut away along a longitudinal edge facing the exterior of the vehicle, as shown at 66a by hatching with broken lines in FIG. 5A. If the front wall 17A of the inflated air bag 50 has a maximum width of 500 mm, the tether 66 may have a width of 150 mm along its edge secured to the base wall and a width of 400 mm along its edge secured to the front wall 17A. These dimensions are provided merely for illustrative purposes. It is contemplated that these sizes may vary. Both larger and smaller sizes are well within the scope of the present invention. The tether 66 may be cut away at 66a to occupy an area of 50% to 80% in the plane in which it extends in the inflated air bag 50. The tether 66 may fail to divide the upper and lower chambers 50a and 50b of the air bag 50 effectively if it occupies only an area smaller than 50%. If the tether occupies an area over 80%, its cutaway portion 66a may fail to control the flow of air into the lower chamber 50b effectively. The spacing between the tether 66 and one of the side walls 20A or 22A is at least two times greater than the spacing between the tether 66 and the other of the side walls 20A or 22A. It is preferable that the spacing is three to five times greater between the tether 66 and the one side wall. If the spacing between the side wall and the tether is smaller than two times greater than the other spacing, the tether may fail to control the flow of air into the lower chamber effectively. If the spacing is larger than by five times than the other spacing, the air bag may encounter unfolding difficulties when inflating.

The air bag 50 has a pair of vent holes 27 formed in the side walls 20A and 22A in the lower chamber 50b, as shown in FIG. 6. The vent holes 27 are preferably parallel slots arranged vertically, or at right angles to the longitudinal axis of the air bag. Other vent hole configurations including but not limited to circular holes are considered to be well within the scope of the present invention. The vent holes may have a short diameter of 50 mm or a longer diameter of 80 mm to 90 mm. It is contemplated that the size of the vent hole may vary. During the initial unfolding and inflation operation, the air bag is unfolded and inflated rapidly without any appreciable widening of the vent holes. At this time, very high tension acts upon the bag. After further inflation, and immediately before the air bag 50 contacts an interfering object (i.e., a passenger), the vent holes are widened by the expansive force of the bag 50 and exhibit a more effective venting action so as to reduce the inflating pressure acting upon the bag and thereby ensure a reduction of any impact load bearing upon the passenger.

The air bag 50 including the tether 66 is likewise folded and incorporated in an air bag device M, as described above. If a predetermined force of impact bears upon the vehicle, a sensor assembly, not shown, activates the inflator 54 to supply inflating gas into the air bag 50 through the air inlet 15 to inflate the air bag 50. The air bag 50 pushes the cover 58 open and unfolds as shown by two-dot chain lines, as described earlier.

Figure 7:
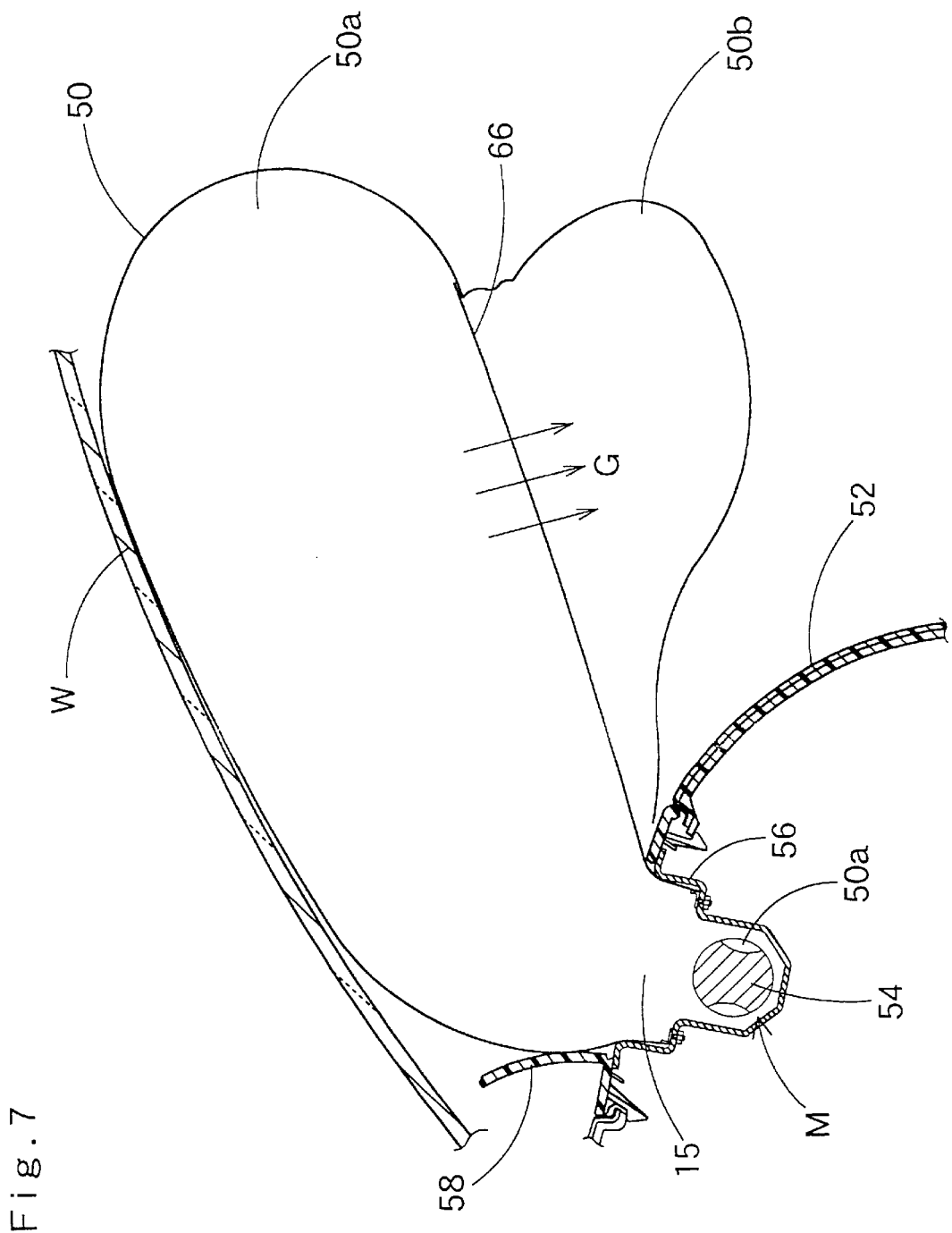
FIG. 7 is a schematic view of an inflated air bag installed in a vehicle.

As the air bag 50 inflates, it extends rearwardly along the windshield W until the tether 66 is substantially fully stretched. The upper chamber 50a is in contact with the windshield W. The inflating gas G then flows into the lower chamber 50b mainly through the larger clearance between one of the longitudinal edges of the tether 66 and the one side wall 20A or 22A so as to inflate the lower chamber 50b to complete the inflation of the air bag 50, as shown in FIG. 7.

If the air bag 50 contacts an interfering object I during inflation before the tether 66 is fully stretched, the inflating gas G also flows from the upper chamber 50a of the air bag 50 into the lower chamber 50b mainly through the larger clearance, described above, between the tether 66 and the one side wall 20A or 22A. As a result, it is possible to control the inflating pressure urging the air bag 50 rearwardly and thereby prevent any undesirably large impact from bearing upon the interfering object I.

Figure 8:
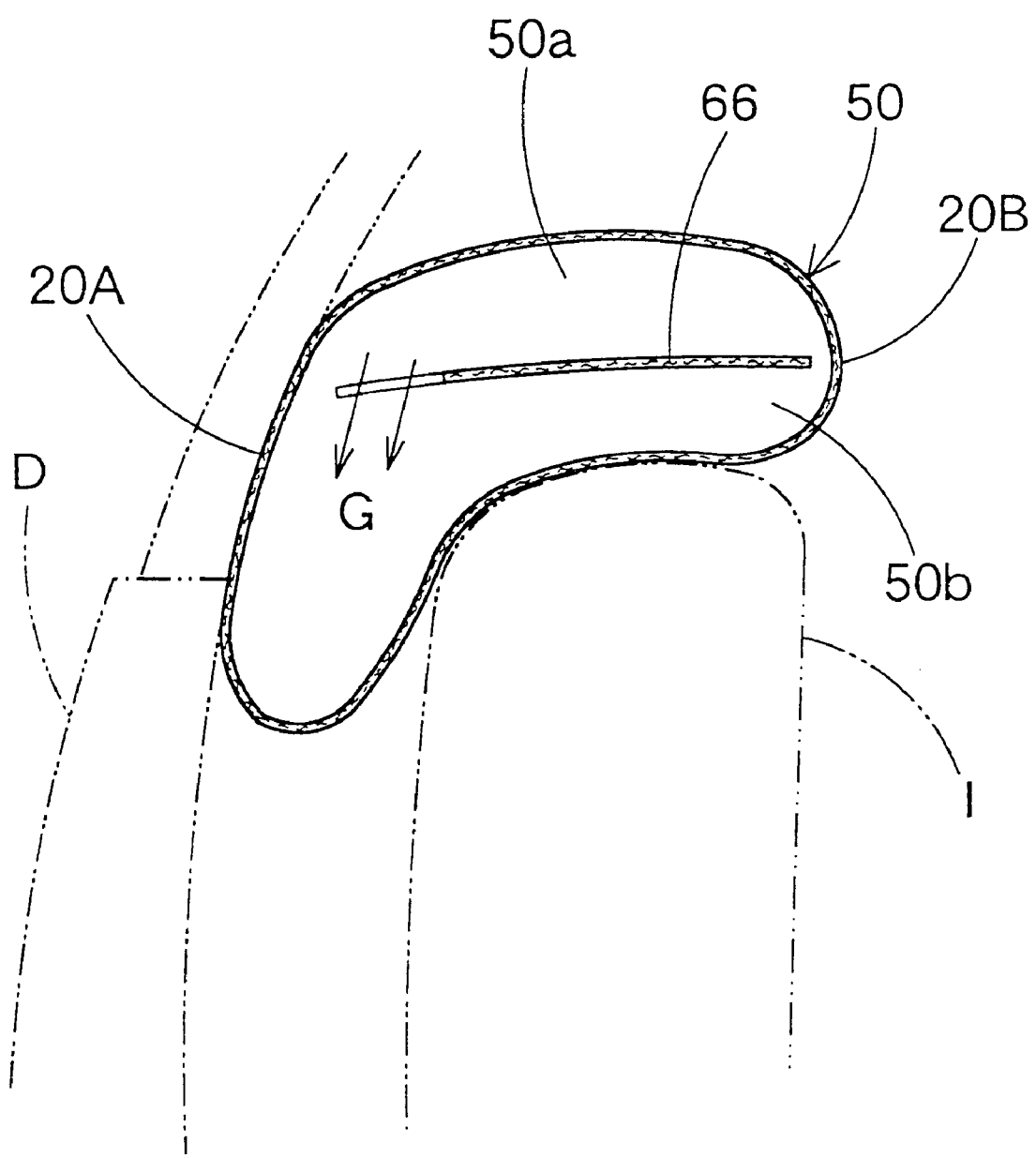
FIG. 8 is a schematic view of an air bag installed in a vehicle and inflated with a lower compartment expanding over an interfering object, as viewed through the windshield.

If the interfering object I is small in height, the air bag 50 extends rearwardly over the interfering object I (e.g., the passenger's head) until the tether 66 is fully stretched. Then, the inflating gas G flows into the lower chamber 50b through the clearance between the tether 66 and the side wall 20A to inflate it, so that the air bag 50 may extend downwardly, too. As a result, the lower chamber 50b of the air bag 50 extends downwardly between the interfering object I, such as the passenger's head, and the side door D of the vehicle, as shown in FIG. 8 (as viewed through the windshield), and thereby keeps the interfering object I from being moved toward the side door, while not exerting any undesirably heavy load upon it. The air bag 50, however, does not exert any undesirably large impact upon the interfering object I, even if it may be situated close to the door, since the air bag 50 is already fully stretched, and the gas flowing back after striking against its front wall 17A does not have a high inflating pressure when flowing downwardly.

Figure 15:
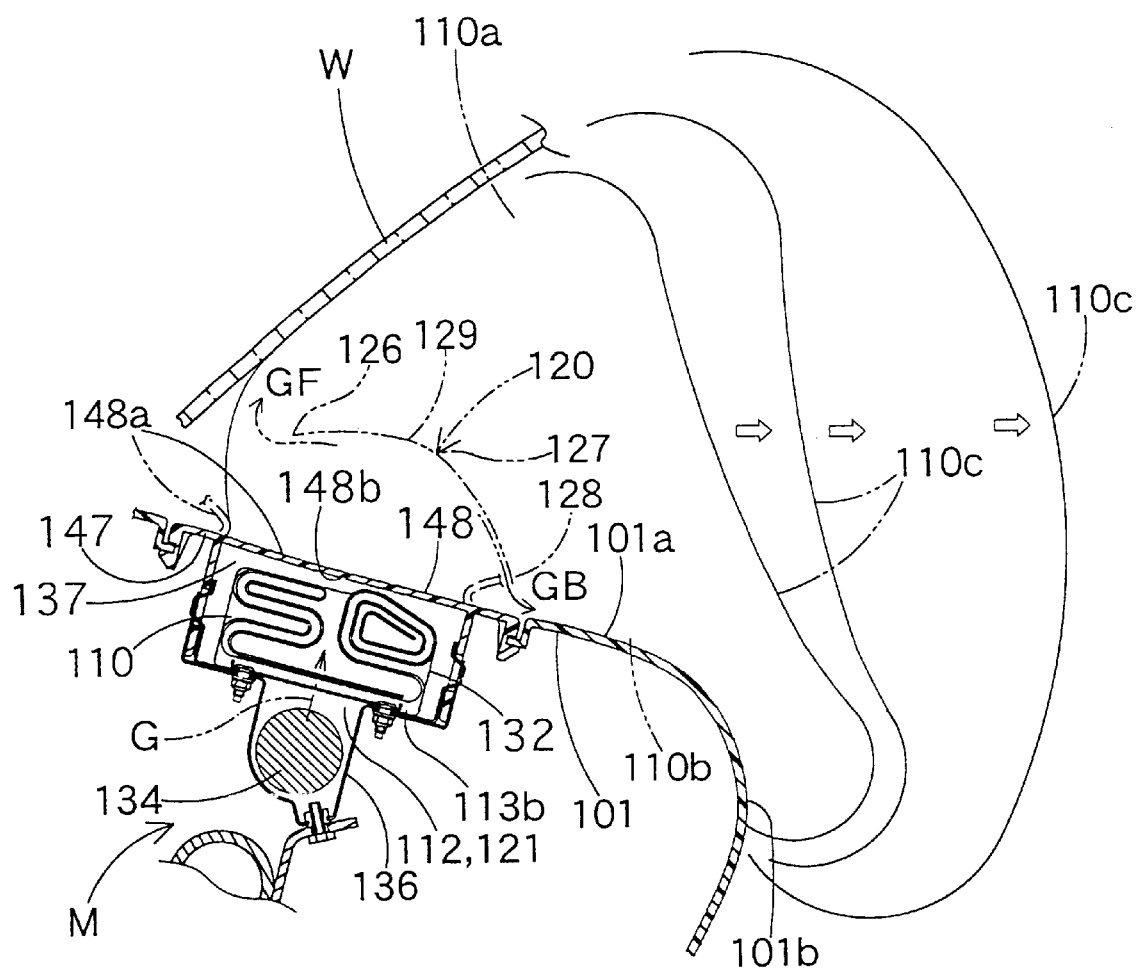
FIG. 15 is a schematic view illustrating the process of inflation of the air bag of FIG. 9 installed in a motor vehicle.

An air bag according to another embodiment of the present invention will now be described in connection with FIGS. 9 to 15. Like the air bags described above, the air bag 110 is also designed for use in a top mount type air bag device M mounted on the top surface 101a of a dashboard 101 for protecting a passenger in a motor vehicle, as shown in FIG. 15. The air bag 110 includes a bag body 111 shaped substantially like a triangular prism having an axis extending transversely of the vehicle when inflated. The air bag 110 also includes an air control assembly for controlling the flow of air within the air bag during the inflation operation. The air control assembly may include a baffle 120 for regulating the flow of inflating gas G in the air bag 110.

The bag body 111 has a rectangular gas inlet 112 formed at a bottom of an end portion facing the front of the vehicle for admitting inflating gas G. The gas inlet 112 is surrounded by a plurality of bolt holes 114. The bag body 111 also has a pair of vent holes 115 for letting out any excess of inflating gas. A substantially square reinforcing piece of cloth 119 woven from e.g. polyester or polyamide yarns is attached to the inner surface of the bag body 111 around the gas inlet 112 and the bolt holes 114.

Figure 11:
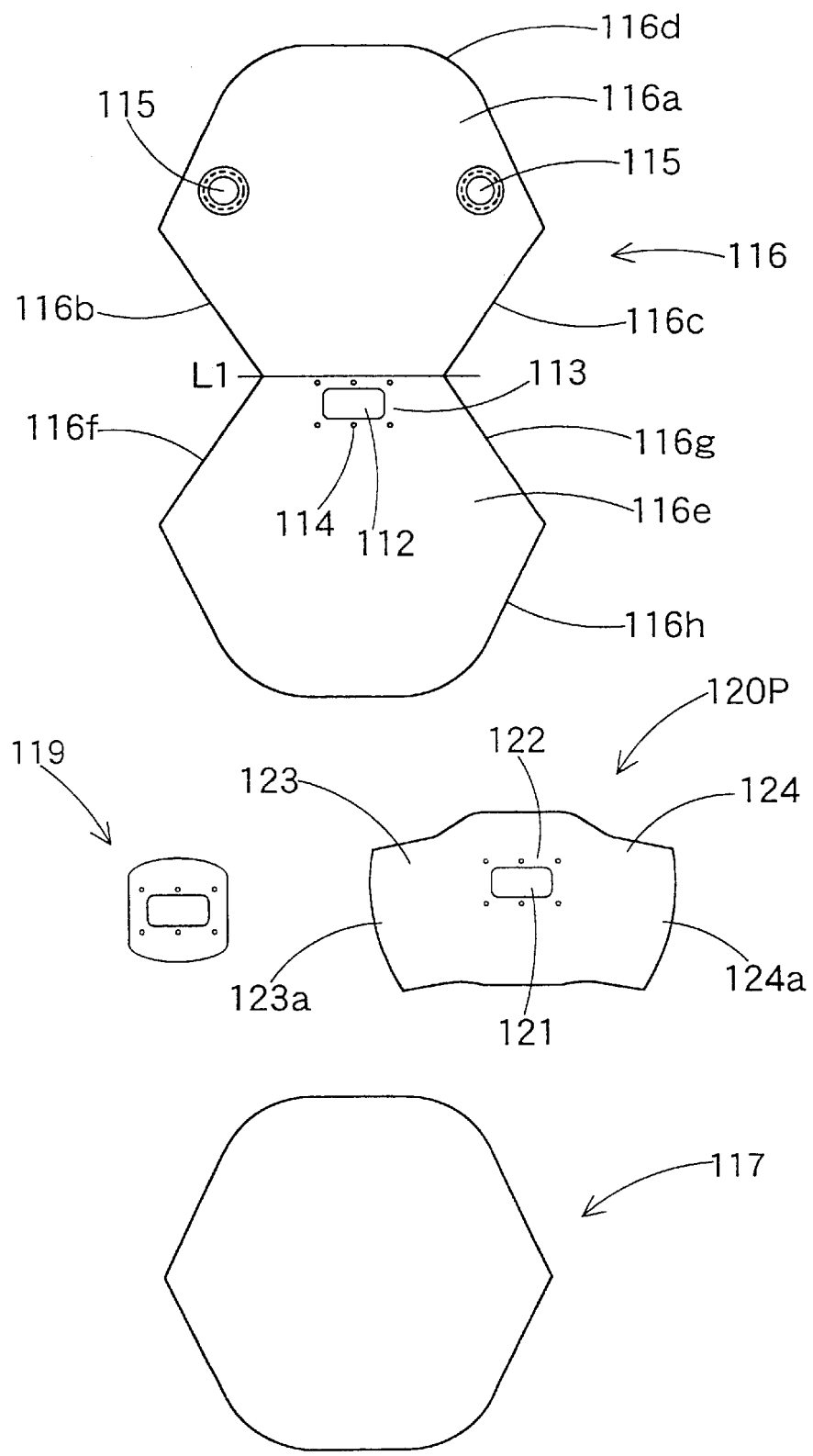
FIG. 11 is a top plan view of the unassembled components forming the air bag of FIG. 9.

The bag body 111 is made by securing together two panels 116 and 117, as shown in FIGS. 11 to 14. The panels are preferably woven from a material, described above. The first or main panel 116 has two half portions 116a and 116e each shaped substantially like a regular hexagon, and is constricted along the boundary between its half portions 116a and 116e, as shown in FIG. 11. The second panel, or subpanel 117 is shaped substantially like a regular hexagon. The bag body 111 having a three-dimensional shape can preferably be formed from the two panels 116 and 117 by a two-dimensional sewing process. The present invention, however, is not limited to a sewing process; rather, other fastening techniques are considered to be well within the scope o the present invention.

Figure 9:
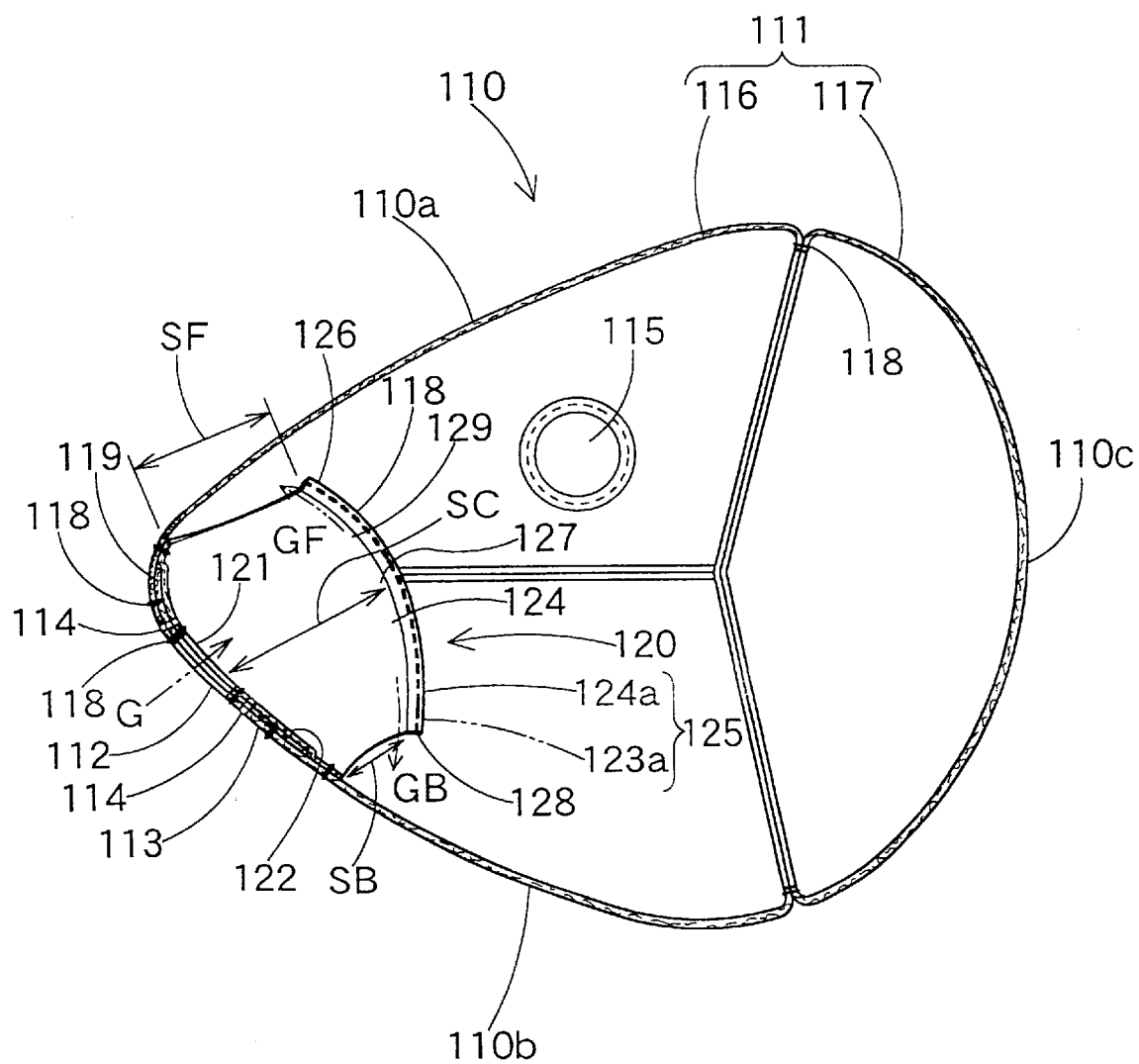
FIG. 9 is a side sectional view of an inflated air bag having a baffle according to another embodiment of the present invention.
Figure 10:
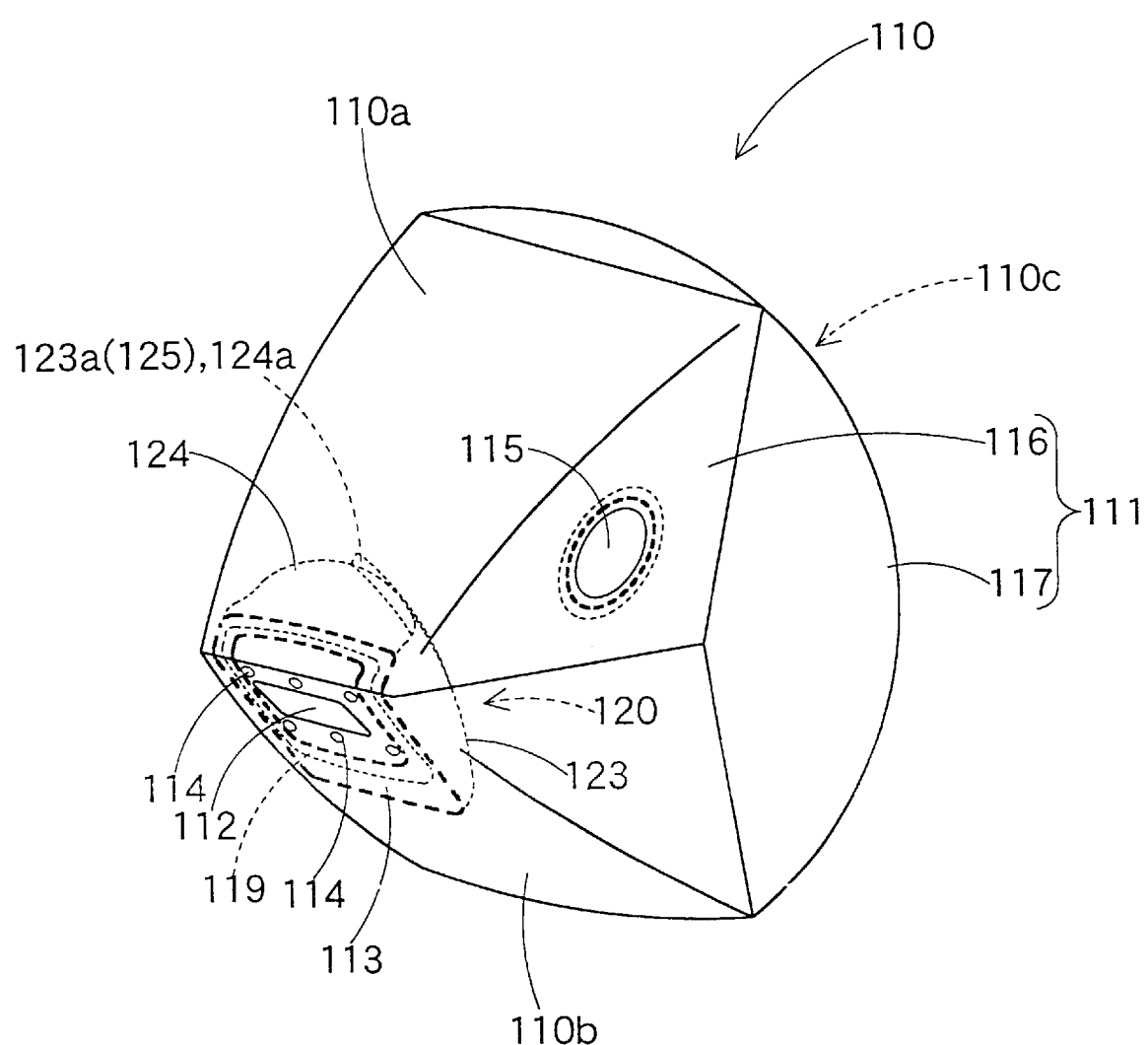
FIG. 10 is a perspective view of the inflated air bag of FIG. 9.
Figure 13A:
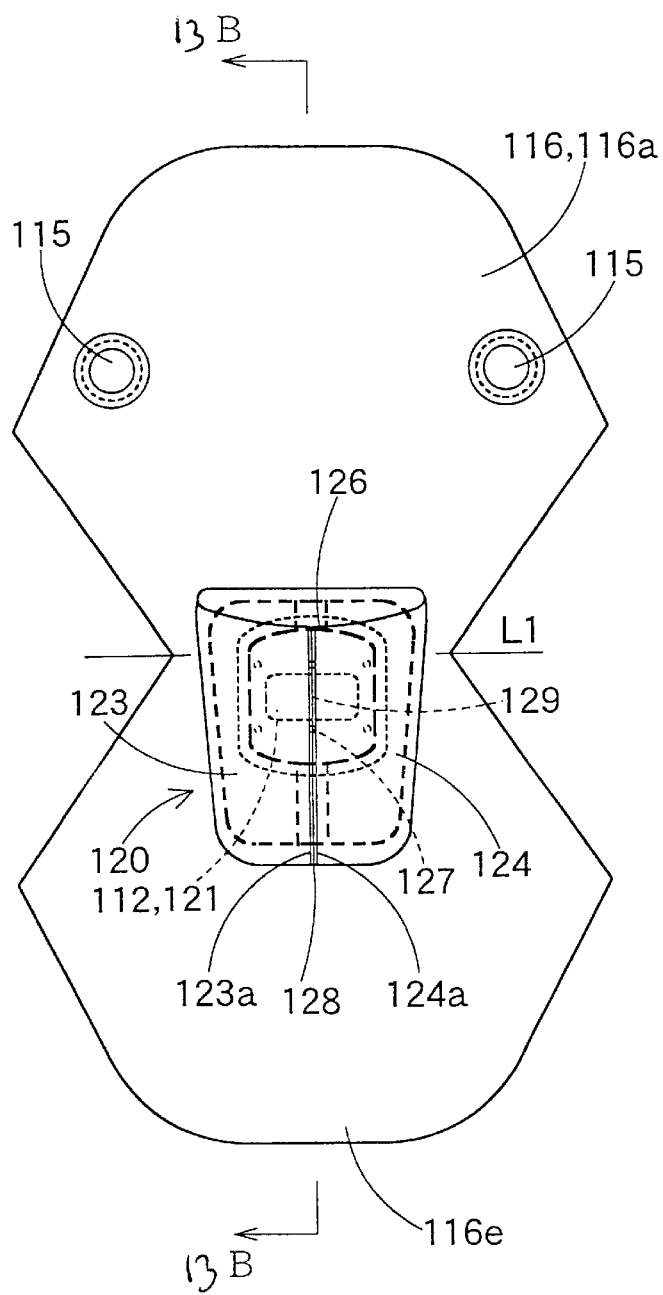
FIG. 13A is a top plan view illustrating the arrangement of components during a step following the step shown in FIGS. 12A and 12B.
Figure 13B:
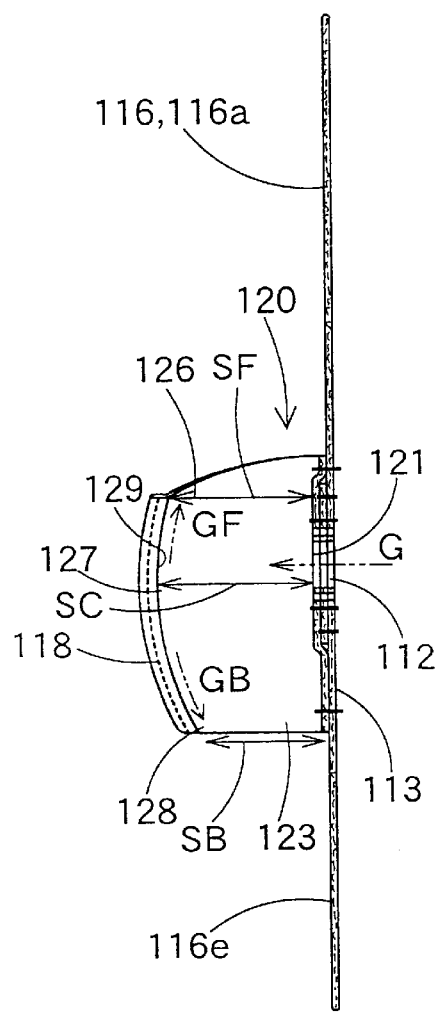
FIG. 13B is a sectional view taken along the line 13B—13B of FIG. 13A.

The baffle 120 is larger in size than the gas inlet 112 along all of its edges so as to cover the gas inlet 112 from inside the bag body 111, as shown in FIG. 10. When the air bag 110 is inflated, the baffle 120 has a curved portion 129 arcuately shaped in longitudinal section and having a concavely curved inner surface facing the gas inlet 112, as shown in FIG. 9. The baffle 120 is formed from a panel 120P, which is woven from the materials, described above. As shown in FIG. 11, the panel 120P has an opening 121 corresponding to the gas inlet 112, an inner edge portion 122 surrounding the opening 121 and a pair of laterally extending portions 123 and 124 each terminating in an arcuate edge 123a or 124a. The panel 120P has a plurality of holes corresponding to the bolt holes 114, as shown in FIG. 11. The inner edge portion 122 of the panel 120P is secured to the bag body 111 around the gas inlet 112 using a suitable fastening mechanism, such as, for example, sewing thread 118 as shown in FIGS. 12A and 12B. The laterally extending portions 123 and 124 are secured to each other along their arcuate edges 123a and 124a, as shown in FIGS. 13A and 13B, whereby the baffle 120 is formed. The baffle 120 has a varying distance between a seam joining the portions 123 and 124 to the bag body 111 around the gas inlet 112 and a seam 125 joining the arcuate edges 123a and 124a to each other. The distance is longer at the front end 126 than at the back end 128, and is longer in the transversely middle portion 127 than at the front end 126. Thus, the baffle 120 forms a tubular path for inflating gas G having a varying cross-sectional area. The cross-sectional area SF at the front end 126 of the baffle 120 is larger than the cross-sectional area SB at the back end 128, but is smaller than the cross-sectional area SC in the middle portion 127. The gas inlet 112 has a width B0 of 61 mm, and the laterally extending portions 123 and 124 have a width B1 of 300 mm along their seam 125, while the seam 125 has a radius R of curvature of 300 mm (see FIG. 12A). These dimensions are merely provided for illustrative purposes; other dimensions are considered to be well within the scope of the present invention.

The fabrication of the air bag 110 will now be described in connection with sewing as the preferred fabrication method. Other methods of fabrication including but not limited to the use of adhesives and bonding are considered to be well within the scope of the present invention. Referring now to the fabrication of the air bag 110, the reinforcing cloth 119 and the baffle panel 120P are first fastened with sewing thread 118 to the main panel 116 along the edge 113 of the gas inlet 112 on the surface defining the inner surface of the air bag 110, as shown in FIGS. 11, 12A and 12B. The laterally extending portions 123 and 124 of the panel 120P are fastened to each other along their edges 123a and 124a with sewing thread 118 to form an arcuate seam to define an appropriate shape for the baffle 120, as shown in FIGS. 13A and 13B. The baffle 120 may have at least one vent hole V for controlling the inflation of the air bag, as shown in FIG. 12B.

The main panel 116 is folded along a first reference line L1 extending transversely between the upper and lower half portions 116a and 116e, and the half portions 116a and 116e are fastened to each other with sewing thread 118 along the adjoining straight edges 116b and 116f on one side of the gas inlet 112 and also along the adjoining straight edges 116c and 116g on the opposite side thereof, as shown in FIGS. 14A and 14B.

The upper half portion 116a of the main panel 116 is folded along a second reference line L2 extending along the largest width, so that the half portions 116a and 116e respectively, may extend in a plane, as shown in FIGS. 14B and 14C. The free edges 116d and 116h are so shaped to lie in a plane and define a contour coinciding with the subpanel 117, as is obvious from FIG. 14C. Therefore, the subpanel 117 is properly placed on the main panel 116 folded as described, and the two panels 116 and 117 are sewn to each other along their coinciding edges to form a shape defining the bag body 111, as shown in FIG. 14D.

The bag body 111, as formed, is reversed so that no margin left for sewing may be exposed on the air bag 110. The bag body is reversed by pulling an inner surface through the gas inlet 112. If it is difficult to reverse in such a way, it is alternatively possible to pull out the laterally extending portions 123 and 124 of the baffle panel 120P and fasten them to each other along their edges 123a and 124a after reversing the bag body 111.

The air bag 110 is installed in a motor vehicle in the manner, described above in connection with airbag 50 as described before, and as shown in FIG. 15. It is advisable to enclose the air bag 110 in a wrapping sheet 132 to keep it in a good folded shape, though it is not essential to do so. During inflation, the air bag 110 breaks the wrapping sheet 132, and protrudes in a largely inflated shape from the upper portion 137 of the housing 136 after tearing open the cover 147 along a tearing line 148b between two portions 148a, as shown in FIG. 15.

The gas G entering the air bag 110 through the inlet 112 is divided by the baffle 120 into a gas stream GF flowing forward in the bag and a gas stream GB flowing backward, as shown in FIGS. 9 and 13B. The gas G flowing into the air bag body 111 through the gas inlet 112 strikes against the arcuately curved portion 129 of the baffle 120 and is thereby deflected to flow along the curved inner surface of the baffle toward the top surface 101a of the dashboard 101 instead of flowing in parallel to the latter, while inflating the bag body 111. As a result, the bag body 111 is likely to extend backwardly from the top surface 101a of the dashboard 101 to the back surface 101b, as shown by two-dot chain lines in FIG. 15.

The baffle 120 can be formed from only a small amount of material. It has only to be formed with a portion having a concavely curved surface facing the gas inlet 112. Nevertheless, it enables the air bag 110 to extend backwardly along the surfaces 101a and 101b of the dashboard 101 during the initial stage of inflation.

The baffle 120 has a middle portion 127 situated somewhat behind the center of the gas inlet 112 to promote the flow of a backward stream of inflating gas GB from the top surface 101a of the dashboard 101 to the back surface 101b. As such, the lower portion 110b of the air bag 110 extends along the surfaces of the dashboard 101. Since the cross-sectional area SF of the baffle 120 at the front end 126 is larger than the cross-sectional area SB at the back end 128, the stream of inflating gas GF flowing forward in the bag is larger than the stream GB flowing backward. As such, the upper portion 110a of the air bag 110 inflates more quickly so that the portion 110c facing the passenger may quickly inflate. The upright portion 110c has a broad area of contact with the passenger such that only a low pressure per unit area may bear upon the passenger.

The arcuately curved portion 129 of the baffle 120 facing the gas inlet 112 of the bag body 111 can be easily formed. If the laterally extending portions 123 and 124 of the panel 120P are sewn to each other along the edges 123a and 124a, after the portion 122 around the opening 121 is fastened to the edge 113 of the inlet 112. Thus, the baffle 120 is easy to form in the bag body 111. The baffle 120 may also be formed if a strip of material extending transversely of a vehicle has its side edges sewn, or otherwise fastened to an air bag along a pair of edges of the inlet 112. The baffle has an appropriately curved portion extending longitudinally of the vehicle and facing the inlet 112 if its front and back edges are appropriately tucked.

Other baffle arrangements are contemplated. The baffle panel 120P may alternatively be composed of two pieces of material, i.e., one forming the edge portion 122 around the opening 121 and one of the laterally extending portions 123 and the other forming the edge portion 122 and the other laterally extending portion 124, which are sewn, or otherwise fastened to the main panel 116 around the edge 113 of the gas inlet 112 before they are joined to each other along edges 123a and 124a. It will be sufficient for only either of those two pieces of material, or even neither, to be so shaped as to form the edge portion 122, if a suitable reinforcing piece of cloth is employed.

While this invention has been described in conjunction with specific embodiments thereof, it is evident that many alternatives, modifications, variations and combination of elements will be apparent to those skilled in the art. For example, the invention has been described by its embodiments directed to three-dimensional air bags, it is also applicable to a planar air bag having its body formed by two panels situated on the inflator 34 and passenger sides, respectively, and sewn, or otherwise joined to each other along their edges. The preferred embodiments of the invention as set forth herein are intended to be illustrative, not limiting. Various changes may be made without departing from the spirit and scope of the invention as defined in the following claims.

What is claimed is:

1. An airbag for a vehicle, comprising:

a main panel having a generally elongated shape and a fold line, the main panel comprising:

a pair of first portions extending from opposite sides of the fold line, wherein each of the pair of first portions is generally symmetric to the other, each of the first portions having a first end adjacent a boundary line and a second end spaced from the boundary line, wherein each of the first portions includes a first edge and a second edge, a pair of second portions, wherein one of the second portions extends from the second end of one of the first portions and another of the second portions extends from the second end of the other of the first portions, wherein each of the second portions includes a peripheral edge, wherein the pair of first portions are secured together along the first edges and the second edges to form a hollow body having an open end; and a subpanel secured to the main panel. wherein the subpanel is secured to the main panel along the peripheral edge of each of the second portions, wherein the subpanel is located opposite an air inlet covering the open end.

2. The air bag according to claim 1, wherein the subpanel has a shape corresponding to a combined shape of the pair of second portions.

3. The air bag according to claim 1, further comprising:

an air control assembly located within the hollow body for controlling the flow of air within the air bag during an inflation operation.

4. The air bag according to claim 3, wherein the air control assembly includes a baffle located within the hollow body adjacent the air inlet.

5. The air bag according to claim 4, wherein the baffle comprises:

a generally tubular body located adjacent the air inlet, wherein the tubular body has a pair of open ends, wherein the tubular body directs air from the air inlet into upper and lower portions of the hollow body through the open ends.

6. The air bag according to claim 5, wherein the tubular body has a larger cross-sectional area adjacent one open end compared to the cross sectional area adjacent the other open end.

7. The air bag according to claim 6, wherein a cross sectional area of a middle portion of the tubular body is greater than the cross-sectional area of the open ends.

8. The air bag according to claim 5, wherein the tubular body is secured to the main panel adjacent the air inlet.

9. The air bag according to claim 5, wherein the tubular body includes a curved surface for directing air from the air inlet to the open ends.

10. The air bag according to claim 9, wherein the tubular body has a larger cross-sectional area adjacent one open end compared to the cross sectional area adjacent the other open end.

11. The air bag according to claim 10, wherein a cross sectional area of a middle portion of the tubular body is greater than the cross-sectional area of the open ends.

12. The air bag according to claim 1, further comprising:

a reinforcing member secured to the main panel adjacent the air inlet, wherein the reinforcing member surrounds the air inlet.

13. The air bag according to claim 1, further comprising:

an air bag opening control assembly for controlling the shape of the airbag during inflation.

14. The air bag according to claim 13, wherein the air bag control assembly includes a tether assembly located within the hollow body.

15. The air bag according to claim 14, wherein the tether assembly divides the hollow body into an upper compartment and a lower compartment.

16. The air bag according to claim 14, wherein the tether assembly is spaced from first edges and second edges of the first portions, wherein the spacing between one of the first and second edges and the tether assembly is greater than the spacing between the other of the first and second edges and the tether assembly.

17. The air bag according to claim 1, wherein the main panel includes at least one vent hole formed therein.

18. An air bag for a vehicle, comprising:

a main panel having an air inlet formed therein;

a subpanel secured to the main panel, wherein the subpanel and main panel form a hollow inflatable body; and an air control assembly located within the hollow body for controlling the flow of air within the air bag during an inflation operation, wherein the air control assembly includes a baffle located within the hollow body adjacent the air inlet, wherein the baffle includes a generally tubular body located adjacent the air inlet, wherein the tubular body has a pair of open ends, wherein the tubular body directs air from the air inlet into upper and lower portions of the hollow body through the open ends, wherein the tubular body has a larger cross-sectional area adjacent one open end compared to a cross sectional area adjacent the other open end.

19. The air bag according to claim 18, wherein a cross sectional area of a middle portion of the tubular body is greater than the cross-sectional area of the open ends.

20. An air bag for a vehicle, comprising:

a main panel having an air inlet formed therein;

a subpanel secured to the main panel, wherein the subpanel and main panel form a hollow inflatable body; and an air control assembly located within the hollow body for controlling the flow of air within the air bag during an inflation operation, wherein the air control assembly includes a baffle located within the hollow body adjacent the air inlet, wherein the baffle includes a generally tubular body located adjacent the air inlet, wherein the tubular body has a pair of open ends, wherein the tubular body directs air from the air inlet into upper and lower portions of the hollow body through the open ends, wherein the tubular body includes a curved surface for directing air from the air inlet to the open ends, wherein the tubular body has a larger cross-sectional area adjacent one open end compared to a cross sectional area adjacent the other open end.

21. The air bag according to claim 20, wherein a cross sectional area of a middle portion of the tubular body is greater than the cross-sectional area of the open ends.

* * * * *